ial side of the plunger into which the undesired surplus end of the line may be inserted, with the plunger having a cutter rim movable for cutting the inserted line.

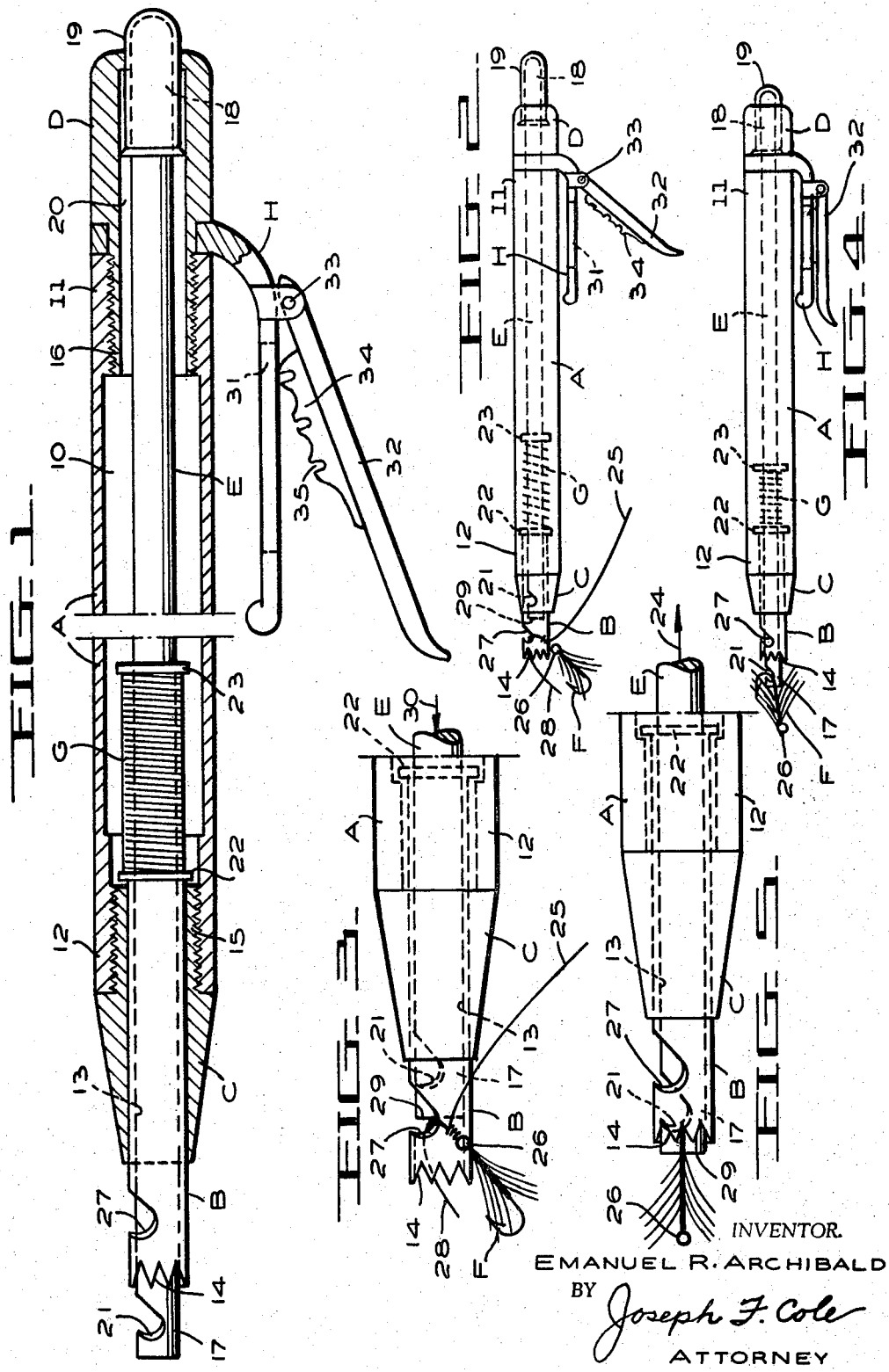

United States Patent Office 3,419,924
Patented Jan. 7, 1969

3,419,924
HOOK HOLDER AND LINE CUTTER
Emanuel R. Archibald, 520 Buckeye St.,
Redwood City, Calif. 94063
Filed Jan. 4, 1967, Ser. No. 607,319
U.S. Cl. 7—14.1                 1 Claim
Int. Cl. B25f 1/04; B26b 11/00

ABSTRACT OF THE DISCLOSURE

A hook holder and line cutter having a sleeve guide provided with a serrated lower tip into which a fish hook may be clamped by a plunger having a recessed catch engageable with the fish hook, the plunger further having a cutter rim for cutting a fish line extending across a cutter notch in the sleeve guide.

Background of the invention (1) *Field of the invention.*—The present invention relates to improvements in a hook holder and line cutter that may be used by a fisherman for holding a hook in firm position while a line or leader is being tied to the eye of the hook, and subsequently the undesired surplus end of the line may be removed by the cutter.

(2) *Description of the prior art.*—Hook holders and line cutters have been provided in the art, and this invention pertains to specific improvements and embodiment.

Summary

It is proposed in this invention to provide a hook holder having a sleeve guide formed with a serrated outer tip into which a fish hook may be inserted, together with a reciprocable plunger formed with a recessed catch in a lateral side thereof for engaging with the hook and clamping the latter in the serrations of the sleeve guide, whereby a fisherman may tie a line or the like to the eye of the hook. The hook holder may be used to remove a hook from the mouth of a fish.

Moreover, it is proposed to provide a cutter notch in a lateral side of the plunger into which the undesired surplus end of the line may be inserted, with the plunger having a cutter rim movable for cutting the inserted line.

Brief description of the drawing

For a better understanding of the invention, reference should be had to the accompanying drawing, forming part of this specification, in which:

FIG. 1 is a fragmentary longitudinal sectional view of the hook holder and line cutter, parts being shown in elevation, and this view being on an enlarged scale.

FIG. 2 is an elevational view on a smaller scale and showing a line being inserted into the cutter notch.

FIG. 3 is an enlarged elevational view of the left-hand portion of FIG. 2 and disclosing the plunger advanced for cutting the inserted line.

FIG. 4 is a view similar to FIG. 2, but showing a fish hook inserted into a recessed catch of the plunger and prior to the plunger being retracted to clamp the hook in place.

FIG. 5 is an enlarged elevational view of the left-hand portion of FIG. 4, but illustrating the plunger as being retracted to clamp the hook against the sleeve guide.

Description of the preferred embodiment

Referring now to the drawing in detail it will be noted that a barrel handle indicated generally at A has been provided, and this handle has an axial bore 10 extending therethrough (see FIG. 1), the handle having upper and lower ends 11 and 12, respectively. A sleeve guide B is secured to the lower section of the handle by a tubular ferrule C and projecting therebelow, the guide defining an axial bore 13 extending therethrough, and the lower outer tip of the guide is formed with serrations 14 therein.

As shown in FIG. 1, the ferrule C has a reduced stem 15 that is threaded into the lower end 12 of the handle A, while a cap D is provided with a reduced stem 16 threaded into the upper end 11 of this handle.

An elongated plunger E is reciprocably mounted in the bores 10 and 13 of the handle A and sleeve guide B, respectively, and this plunger has a lower end section 17 movable into a position below the serrated tip of the guide when the upper end 18 of the plunger is depressed relative to the handle, for instance, by a cap-shaped button 19 surrounding the upper end portion of the plunger and guided in an axial bore 20.

The lower end section 17 of the plunger E is formed with a recessed catch 21 in a lateral side thereof into which a fish hook F may be inserted when the plunger is depressed (see FIG. 4). In order to retract the plunger E relative to the sleeve guide B until the inserted fish hook F is clamped in the serrations 14 of the guide by the recessed catch 21 (see FIG. 5), with the serrations holding the hook against accidental dislodgment from the catch 21, a compression spring G has been provided.

As clearly illustrated in FIG. 1, the sleeve guide B has a stop flange 22 on its inner end butting against the inner end of the ferrule C. One end of the spring G bears against this stop flange and the other end of the spring bears against an annular flange 23 provided on the plunger. When the button 19 is released, the spring will tend to retract the lower end section 17 of the plunger into the bore 13 of the guide B, as suggested by the arrow 24 in FIG. 5.

When the fish hook F is clamped in place by the serrations 14 and the recessed catch 21, a line 25 may be passed through the eye 26 of the hook and the line tied to the hook. It will be understood, of course, that the hook F may be of any suitable type and size, and that the term "line" is sufficiently broad to include leaders. Moreover, the serrations 14 and the recessed catch 21 may be used for engaging with a hook in the mouth or throat of a fish so that the hook may be removed.

As a further structural feature, the sleeve guide B is formed with a cutter notch 27 in a lateral side thereof into which the undesired surplus end 28 of the line may be inserted (see FIGS. 2 and 3), with the line extending across the bore 13 of the guide. The plunger E has a cutter rim 29 at its lower end that is movable longitudinally across the cutter notch 27 so as to cut the inserted line when the upper end 18 of the plunger is depressed relative to the handle A by the button 19, as suggested by the arrow 30 in FIG. 3. Obviously, the cutter notch 27 and the cutter rim 29 may be used to cut other parts of the line, or other suitable material.

The plunger E is rotatable with respect to the sleeve guide B so as to present selected new sections of the cutter rim in registry with the cutter notch 27 for cutting operations. This feature is desirable when the cutting rim 29 wears due to usage.

It will be observed from FIGS. 1 and 2 that a pocket clip H is secured to the barrel handle A by the cap D, and this clip has a slot 31 formed therein. Lever 32 is swingably secured to the pocket clip H by a pin 33 and has a blade 34 thereon that may be pressed into the slot 31 to serve as a cutter for light-heavy lines. The blade 34 has a series of notches 35 formed therein to receive a line to be cut, and these notches prevent the line from slipping along the length of the pocket clip as the lever is pressed toward the clip. The tolerance between the blade 34 and the edge walls of the slot 31 is very little so that the edges of the blade will rub against the walls of the slot as the blade passes through the slot, causing a shearing action on the line.

I claim:
1. In a hook holder and line cuttter:
(a) a barrel handle defining an axial bore extending therethrough, the handle having upper and lower ends;
(b) a sleeve guide secured to the lower section of the handle and projecting therethrough, the guide defining an axial bore extending therethrough, and the lower outer tip of the guide being formed with serrations therein;
(c) a plunger reciprocably mounted in the bores of the handle and guide, the plunger having a lower end section movable into a position below the serrated tip of the guide when the upper end of the plunger is depressed relative to the handle;
(d) this lower end section of the plunger being formed with a recessed catch in a lateral side thereof into which the hooked portion of a fish hook may be inserted when the upper end of the plunger is depressed;
(e) resilient means operable to automatically retract the plunger relative to the guide until the inserted fish hook is clamped in the serrated tip of the guide by the recessed catch, with the serrations holding the hook against accidental dislodgment from the catch until such time as the plunger is manually depressed whereby said hook will be fixedly clamped therein with the opposing shank end of said hook projecting generally longitudinally of and beyond the lower end of said plunger so that a fish line, or the like, may be tied to an eye on the shank;
(f) the sleeve guide being formed with a cutter notch in a lateral side thereof into which said fish line, or the like, may be inserted, with the line extending across the bore in the guide;
(g) the plunger having a cutter rim at its lower end, the plunger being retractable into the sleeve guide until its cutter rim is disposed above the cutter notch, and the plunger being depressible until its cutter rim is moved longitudinally across the cutter notch so as to cut the inserted line, or the like.

References Cited

UNITED STATES PATENTS

| | | | |
|---|---|---|---|
| 340,212 | 4/1886 | Heath et al. | 30—113 |
| 370,735 | 9/1887 | Gonon | 30—113 X |
| 1,124,651 | 1/1915 | Peterson | 7—14.1 X |
| 1,539,221 | 5/1925 | Tennant. | |
| 1,590,075 | 6/1926 | Brenner | 30—254 |
| 2,507,083 | 5/1950 | Anderson | 43—53.5 |
| 3,132,438 | 5/1964 | Ward et al. | 43—53.5 |
| 1,908,890 | 5/1933 | Burns | 30—113 X |

FOREIGN PATENTS

| | | |
|---|---|---|
| 1,109,348 | 9/1955 | France. |
| 873,063 | 7/1961 | Great Britain. |

MILTON S. MEHR, *Primary Examiner.*

U.S. Cl. X.R.

43—53.5